R. FRIEDRICH & F. HIRSCH.
PROCESS OF MANUFACTURE OF SULFITES OR BISULFITES.
APPLICATION FILED OCT. 31, 1910.
1,091,429.
Patented Mar. 24, 1914.
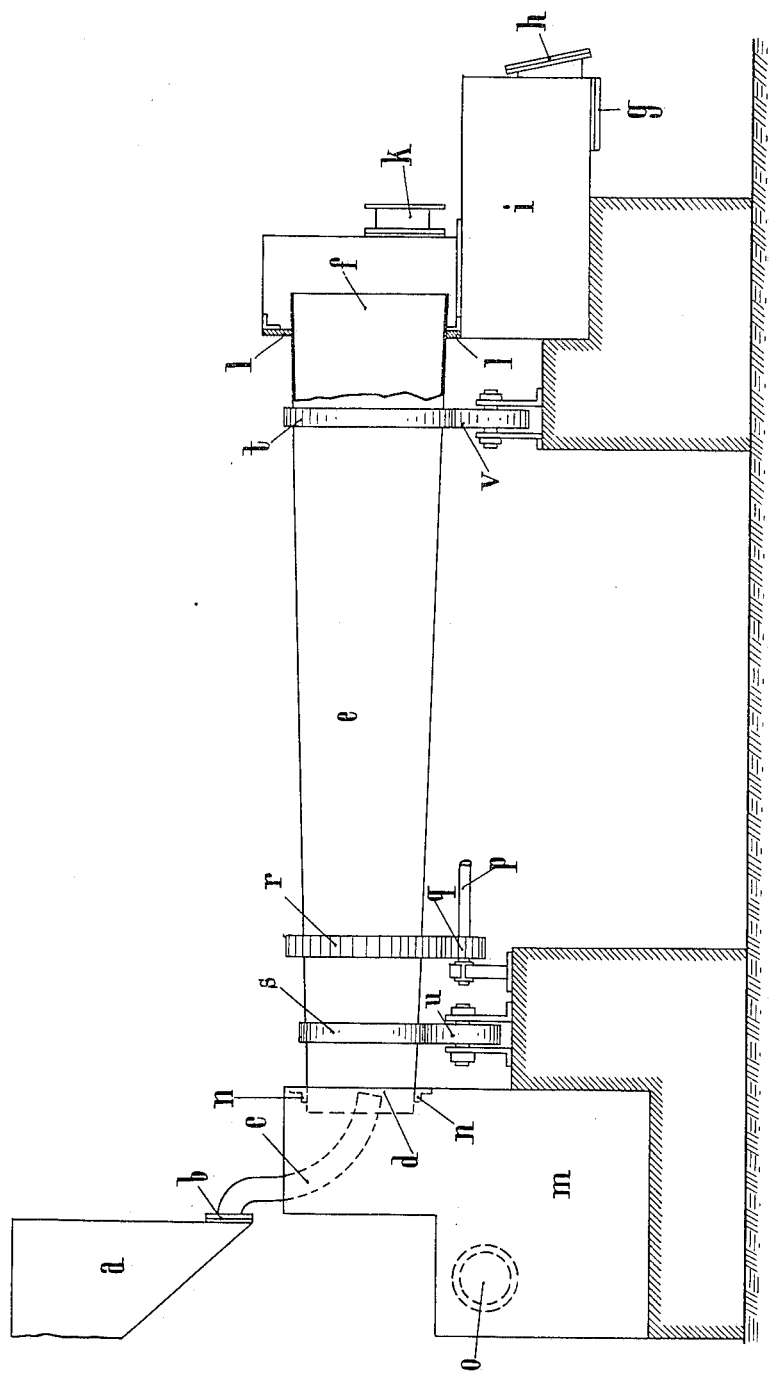

UNITED STATES PATENT OFFICE.

RICHARD FRIEDRICH, OF GLÖSA, NEAR CHEMNITZ, GERMANY, AND FRIEDRICH HIRSCH, OF VIENNA, AUSTRIA-HUNGARY.

PROCESS OF MANUFACTURE OF SULFITES OR BISULFITES.

1,091,429. Specification of Letters Patent. Patented Mar. 24, 1914.

Application filed October 31, 1910. Serial No. 589,999.

*To all whom it may concern:*

Be it known that we, RICHARD FRIEDRICH, Ph. D., chemist, and FRIEDRICH HIRSCH, Ph. D., chemist, subjects, respectively, of the King of Prussia and the Emperor of Austria - Hungary, residing, respectively, at Glösa, near Chemnitz, Germany, and at Praterstrasse 33, Vienna, Austria - Hungary, have invented certain new and useful Improvements in Processes of Manufacture of Sulfites or Bisulfites, of which the following is a specification.

This invention relates to a process for the manufacture of sulfites or bisulfites from raw materials such as oxids, hydroxids, carbonates, or sulfites of the metals alkaline earths or alkalis.

The process is carried out by placing the raw material, which is to be converted into sulfite or bisulfite, in a solid crushed state, in one of the various known mixing apparatus suitable for the purpose, continuously moving the raw material in a direction to meet a current of sulfurous acid gas flowing in the opposite direction and constantly mixing or agitating the raw material during its advance through the mixing device. Mixing apparatus of the kind in question may, for example, consist of inclined tubes, rotating on their axes, inclined stationary tubes fitted with stirrers, rotary conical drums provided with conveying devices, closed trough-shaped apparatus, or the like, an example of which will be more fully hereinafter described.

The raw material as above must at all times contain a definite quantity of chemically combined or hygroscopic water. The amount of water employed is so calculated in each individual case, that the heat of the reaction occurring on the absorption of the sulfurous acid gas will partially or completely evaporate the water, so that the finished product issuing from the apparatus will exhibit the required degree of moisture or dryness. The velocity with which the raw material is moved to meet the current of sulfurous acid gas, is also regulated so that the finished product issuing from the mixing apparatus will also exhibit the desired content of sulfurous acid in each case.

One form of apparatus for carrying the process into practice is represented in the accompanying drawing. The same substantially consists of a conical drum, revoluble about a horizontal axis, to which the raw material is supplied at its narrow end, while the gas containing sulfurous acid enters at the wider end. By rotating the drum the raw material is fed against the current of gas to the wider end of the drum and becomes converted along this path with the gas to the desired final product.

The raw material passes from the feed hopper $a$ by way of the automatically operated slide valve $b$ and the pipe $c$ into the narrow end $d$ of the conical drum $e$. On passing through the same it issues at the wider end $f$ and falls into the stationary collecting box $i$ which is provided both with a discharge slide valve $g$ and a cleaning hole $h$, and into which the gas containing sulfurous acid enters at $k$. For the purpose of making a tight closure between the rotating drum $e$ and the box $i$ the latter is provided with a ring of felt $l$. The stationary dust chamber $m$ at the narrow end of the drum is also provided with a felt packing-ring $n$. The gas issues at the branch pipe $o$ of the dust chamber $m$.

The drum $e$ is driven by the driving shaft $p$ through the medium of a pinion $q$ meshing with a toothed rim $r$ on the periphery of the drum. The drum is journaled by means of two rings $s$ and $t$ provided on the periphery of the drum and running on rollers $u$ and $v$. The inner wall of the drum may be provided with radial plates or helical screw-threads or the like, which cause the raw material to be turned and transported better than would otherwise be the case.

It is comparatively easy to obtain solutions of sulfite salts in a continuous operation in view of the fact that these solutions are easily movable and contain a relatively unlimited quantity of water and as a consequence are more capable of reaction so that at will and with very little difficulty neutral acid sulfites containing predeterminable amounts of sulfurous acid are readily obtainable. The conditions are very different, however, in obtaining by continuous operation sulfite salts in a solid form, and up to the present time the production of these salts in a solid form by a continuous operation as well as bisulfites or pyrosulfites in powder form with a predeterminable amount of sulfurous acid and water in a continuous operation has been unsuccessful. The advantage of the preparation of such salts as against the obtaining of solutions is, however, very obvious, as the wet process in view of the separation of the products from the solutions and in consequence of increased insulation and drying requires a great number of various apparatus as well as extra expense of power, steam and wages with a consequent increase in the general cost of production and use. The failure of former processes to produce solid sulfites appears to be the fact that the quantity of water necessary for the reaction was not present in all stages of the process in sufficient quantity. A further reason was that the heat of reaction developed could not dissolve or fuse the powdered raw material, for instance, soda, potash containing water, or sulfites already formed and as a result a continuous absorption was not effected in the fused mass. It has been ascertained that such injurious secondary effects cannot be avoided even by outer cooling or heating. The final product of the irregular progress of reaction did not represent a united body, but consisted of a compound of sulfites which always changed the contents of sulfurous acid and water.

After numerous practical tests the foregoing process was discovered to be practical and a comparatively economical manner of obtaining sulfites of always the same predeterminable composition in continuous operation has been realized. One of the basic conditions of the improved process is that the raw materials must be exposed in a finely powdered form to a continuous current of sulfurous acid and that this property of the raw material is retained during the entire process or up to the end of the absorption process and the escape or removal thereof from the vessel in which the reaction takes place. A further condition is that a certain amount of chemically bound or merely adhering water is present and that this determined amount of water is not being lost during the process, as without the presence of water no influence at all of the sulfurous acid takes place on the raw material. Consequently the current of sulfurous acid is regulated in proportion to the amount of water of the raw materials to render the reaction successful and prevent the harmful secondary effects hereinbefore mentioned.

What is claimed is:—

1. A process of manufacture of solid sulfites or bisulfites of homogeneous chemical constitution from raw materials which are capable of forming sulfites by the action of sulfurous acid gas, which consists in continuously moving in one direction the raw material in a solid crushed state and containing predetermined quantity of water according to the sulfite to be produced, causing a current of sulfurous acid gas to flow in an opposite direction to meet the raw material, and constantly mixing the raw material during its advance.

2. A process of manufacture of solid sulfites or bisulfites of homogeneous chemical constitution from raw materials which are able to form sulfites by the action of sulfurous acid gas which consists in continuously moving in one direction the raw materials in a solid crushed state and having a quantity of water incorporated therewith which is predetermined according to the sulfite to be produced, causing a current of sulfurous acid gas flow in the opposite direction to meet the raw material, and constantly mixing the solid raw material during its advance, the quantity of water used being so calculated that the heat of the reaction will evaporate only a part of the water so that the finished product will contain the required amount of moisture, the velocity with which the raw material and the sulfurous acid gas are brought into mutual contact being regulated that the finished product will also contain the desired quantity of sulfurous acid.

In testimony whereof we have hereunto set our hands in presence of two subscribing witnesses.

Dr. RICHARD FRIEDRICH.
FRIEDRICH HIRSCH.

Witnesses:
Wm. Washington Brunswick,
William J. Koujetsey.